(12) United States Patent
Tian

(10) Patent No.: US 11,854,118 B2
(45) Date of Patent: Dec. 26, 2023

(54) METHOD FOR TRAINING GENERATIVE NETWORK, METHOD FOR GENERATING NEAR-INFRARED IMAGE AND DEVICE

(71) Applicant: BEIJING BAIDU NETCOM SCIENCE AND TECHNOLOGY CO., LTD., Beijing (CN)

(72) Inventor: Fei Tian, Beijing (CN)

(73) Assignee: Beijing Baidu Netcom Science and Technology Co., LTD., Beijing (CN)

(*) Notice: Subject to any disclaimer, the term of this patent is extended or adjusted under 35 U.S.C. 154(b) by 165 days.

(21) Appl. No.: 17/152,293

(22) Filed: Jan. 19, 2021

(65) Prior Publication Data
US 2021/0224993 A1  Jul. 22, 2021

(51) Int. Cl.
*G06T 11/00* (2006.01)
*G06N 3/088* (2023.01)
(Continued)

(52) U.S. Cl.
CPC ........... *G06T 11/001* (2013.01); *G06N 3/045* (2023.01); *G06N 3/088* (2013.01); *G06T 7/0014* (2013.01);
(Continued)

(58) Field of Classification Search
CPC ......... G06T 7/0014; G06T 2207/10048; G06T 2207/20081; G06T 2207/20084;
(Continued)

(56) References Cited

U.S. PATENT DOCUMENTS

| 2004/0017932 A1 | 1/2004 | Yang |
| 2016/0048984 A1* | 2/2016 | Frigo .................... G06T 11/008 382/131 |

(Continued)

FOREIGN PATENT DOCUMENTS

| CN | 1302437 A | 7/2001 |
| CN | 108009531 A | 5/2018 |

(Continued)

OTHER PUBLICATIONS

Dosovitskiy et al., "Generating Images with Perceptual Similarity Metrics based on Deep Networks", NIPS (Year: 2016).*
(Continued)

*Primary Examiner* — Nancy Bitar
*Assistant Examiner* — Xiao Liu
(74) *Attorney, Agent, or Firm* — Lippes Mathias LLP

(57) ABSTRACT

A method for training generative network, a method for generating near-infrared image and device. The method includes: obtaining a training sample set, in which the set includes near-infrared image samples and visible-light image samples; obtaining an adversarial network to be trained, in which the generative network of the adversarial network is configured to generate each near-infrared image according to an input visible-light image, the discrimination network of the adversarial network is configured to determine whether an input image is real or generated; constructing a first objective function according to a first distance between each generated near-infrared image and the corresponding near-infrared image sample in an image space and a second distance between each generated near-infrared image and the corresponding near-infrared image sample in a feature space; performing an adversarial training on the adversarial network with the set based on optimizing a value of the first objective function.

18 Claims, 5 Drawing Sheets

(51) Int. Cl.

| | | |
|---|---|---|
| *G06T 7/00* | (2017.01) | |
| *G06N 3/045* | (2023.01) | |
| *G06V 10/764* | (2022.01) | |
| *G06V 10/80* | (2022.01) | |
| *G06V 10/82* | (2022.01) | |
| *G06V 10/143* | (2022.01) | |
| *G06V 40/16* | (2022.01) | |

(52) U.S. Cl.
CPC .......... *G06V 10/143* (2022.01); *G06V 10/764* (2022.01); *G06V 10/803* (2022.01); *G06V 10/82* (2022.01); *G06V 40/171* (2022.01); *G06T 2207/10048* (2013.01); *G06T 2207/20081* (2013.01); *G06T 2207/20084* (2013.01); *G06T 2207/30201* (2013.01)

(58) Field of Classification Search
CPC ......... G06T 2207/30201; G06T 11/001; G06T 11/003; G06T 11/40; G06T 17/00; G06N 3/0454; G06N 3/088; G06N 3/08; G06N 3/04; G06N 20/00; G06K 9/6289; G06K 9/6256; G06V 10/143; G06V 10/764; G06V 10/803; G06V 10/82; G06V 40/171
See application file for complete search history.

(56) References Cited

U.S. PATENT DOCUMENTS

| | | | | |
|---|---|---|---|---|
| 2016/0086017 A1* | 3/2016 | Rodriguez | ........... | G06V 40/172 382/118 |
| 2021/0186397 A1* | 6/2021 | Weisberg | ................. | G06N 3/08 |

FOREIGN PATENT DOCUMENTS

| | | | | | |
|---|---|---|---|---|---|
| CN | 108509892 | A | * | 9/2018 | ......... G06K 9/00228 |
| CN | 108509892 | A | | 9/2018 | |
| CN | 108537135 | A | | 9/2018 | |
| CN | 108694709 | A | * | 10/2018 | ............... G06T 5/50 |
| CN | 110633698 | A | * | 12/2019 | |
| CN | 110633698 | A | | 12/2019 | |
| JP | 2007133560 | A | | 5/2007 | |
| JP | 2017010543 | A | | 1/2017 | |
| WO | 0021087 | A2 | | 4/2000 | |

OTHER PUBLICATIONS

Chen et al., InfraRed Images Augmentation Based on Images Generation with Generative Adversarial Networks, 2019 IEEE International Conference on Unmanned Systems (ICUS) pp. 62-66 (Year: 2019).*

Marc Górriz Blanch etal, End-to-End Conditional GAN-based Architectures for Image Colourisation, 2019 IEEE 21st International Workshop on Multimedia Signal Processing (MMSP) (Year: 2019).*

Weng, From GAN to WGAN, arXiv:1904.08994v1 Apr. 18, 2019.*

Jin et al., A survey of infrared and visual image fusion methods, Infrared Physics & Technology, vol. 85, September, pp. 478-501 (Year: 2017).*

Extended European Search Report for Application No. 21152519.1, dated May 27, 2021, 11 pages.

Sami Varjo et al., "Comparison of Near Infrared and Visible Image Fusion Methods", Nokia Research Center, Tampere, Finland, Jan. 1, 2011, 6 pages.

Martin Arjovsky et al., "Wasserstein GAN", Courant Institute of Mathematical Sciences Facebook AI Research, Mar. 9, 2018, 32 pages.

Alexey Dosovitskiy et al., "Generating Images with Perceptual Similarity Metrics based on Deep Networks", Feb. 8, 2016, 14 pages.

Huijiao Wang et al., "Facial Feature Embedded CycleGAN for VIS-NIR Translation", Apr. 20, 2019, 8 pages.

Office Action for Japanese Application No. 2021-006791, dated Feb. 8, 2022, 4 pages.

Rui Huang et al., "Beyond Face Rotation: Global and Local Perception GAN for Photorealistic and Identity Preserving Frontal View Synthesis", Aug. 4, 2017, Printed from the Internet, 12 pages.

OA for CN application 202010065711.2—Jan. 4, 2023, 6 pages.

English translation of OA for CN application 202010065711.2—Jan. 4, 2023, 11 pages.

He, et al. "A Method for Extracting Temperature Based on Infrared Thermographs", Kumming Univeristy of Science & Technology, Computing Technology and Automation, vol. 35, No. 3, Sep. 2016, 5 pgs.

Chen, "Study on Color Harmonization of Remote Sensing Images", A Dissertation Submitted to Zhejiang University for the Degree of Master of Engineering, College of Computer Science, May 2007, 60 pages.

He, "Dynamic Human Body Projection Mapping Based on Kinect", Dissertation Submitted to Shanghai Jiao Tong University for Master Degree of Engineering, School of Software, Dec. 2017, 72 pgs.

Office Action for Korean Application No. 10-2021-0007477, dated Jul. 30, 2023, 21 pages.

Blanch, Marc Górriz et al.; "End-to-End Conditional GAN-based Architectures for Image Colourisation"; 2019 IEEE 21st International Workshop on Multimedia Signal Processing (MMSP); Sep. 5, 2019; 6 pages.

Weng, Lilian; "From GAN to WGAN"; Apr. 18, 2019; 12 pages.

\* cited by examiner

METHOD FOR TRAINING GENERATIVE NETWORK, METHOD FOR GENERATING NEAR-INFRARED IMAGE AND DEVICE

CROSS REFERENCE TO RELATED APPLICATION

This application is based on and claims priority to Chinese patent application No. 202010065711.2 filed on Jan. 20, 2020, the entire content of which is hereby introduced into this application as a reference.

FIELD

Embodiments of the disclosure relate to a field of computer, and particularly to a field of computer vision technologies.

BACKGROUND

Image recognition technologies are a top topic in the field of computer vision technologies. In recent years, many successful cases have been achieved, such as face recognition and target detection. Taking the face recognition as an example, visible light conditions in environment are varied and complex, so performance of the face recognition is easily affected by changes in visible light sources.

SUMMARY

According to a first aspect of the present disclosure, a method for training a generative network is provided. The method includes:

obtaining a training sample set, in which the training sample set includes near-infrared image samples and visible-light image samples;

obtaining an adversarial network to be trained, in which the adversarial network includes the generative network and a discrimination network, the generative network is configured to generate each near-infrared image according to an input visible-light image, the discrimination network is configured to determine whether an input image is real or generated;

constructing a first objective function according to a first distance between each generated near-infrared image and the corresponding near-infrared image sample in an image space and a second distance between each generated near-infrared image and the corresponding near-infrared image sample in a feature space;

performing an adversarial training on the adversarial network with the training sample set based on optimizing a value of the first objective function.

According to a second aspect of the present disclosure, a method for generating a near-infrared image is provided. The method includes:

obtaining a visible-light image including a target object;

obtaining the near-infrared image by inputting the visible-light image into a generative network trained based on the method according to any one of the embodiments of the first aspect of the present disclosure.

According to a third aspect of the present disclosure, an electronic device is provided. The electronic device includes: at least one processor; and a memory connected in communication with the at least one processor; in which, the memory stores instructions executable by the at least one processor, when the instructions are executed by the at least one processor, the at least one processor is configured to:

obtain a training sample set, in which the training sample set includes near-infrared image samples and visible-light image samples;

obtain an adversarial network to be trained, in which the adversarial network includes the generative network and a discrimination network, the generative network is configured to generate each near-infrared image according to an input visible-light image, the discrimination network is configured to determine whether an input image is real or generated;

construct a first objective function according to a first distance between each generated near-infrared image and the corresponding near-infrared image sample in an image space and a second distance between each generated near-infrared image and the corresponding near-infrared image sample in a feature space;

perform an adversarial training on the adversarial network with the training sample set based on optimizing a value of the first objective function.

Additional aspects and advantages of embodiments of the present disclosure will be given in part in the following descriptions.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope of the disclosure. Meanwhile, for clarity and conciseness, descriptions for well-known functions and structures are omitted in the following description.

Embodiment 1

Figure 1:
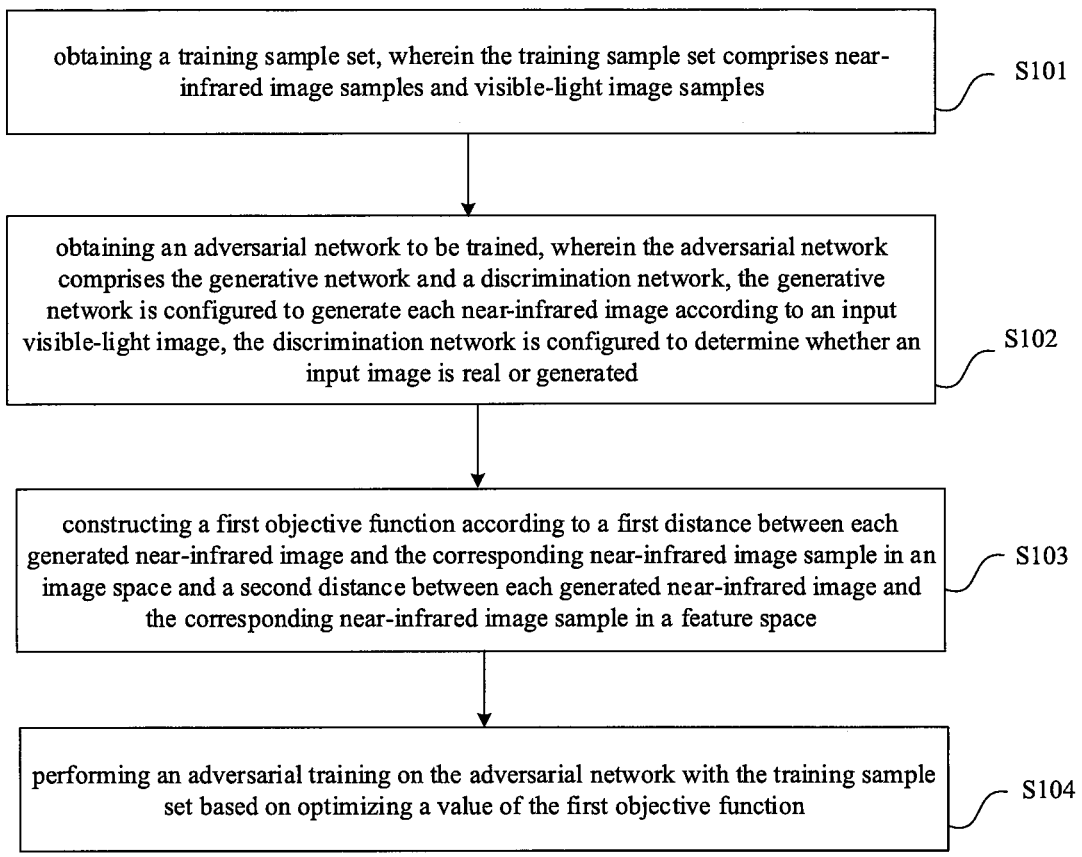
FIG. 1 is a flow chart illustrating a method for training a generative network according to Embodiment 1 of the present disclosure.

FIG. 1 is a flow chart illustrating a method for training a generative network according to Embodiment 1 of the present disclosure. Embodiments of the disclosure are applicable to a condition for training the generative network configured for generate a near-infrared image according to a visible-light image. Embodiments may be executed by an apparatus for training a generative network. The apparatus may be implemented by software and/or hardware and be configured in an electronic device having a certain data operation ability.

As illustrated in FIG. 1, the method for training a generative network includes the following.

At block S101, a training sample set is obtained. The training sample set includes near-infrared image samples and visible-light image samples.

In the embodiment, the training sample set includes multiple groups of near-infrared image sample and visible-light image sample. Images included in each group of near-infrared image sample and visible-light image sample have the same content. For example, one group of near-infrared image sample and visible light image sample is obtained by respectively employing a near-infrared camera and a common visible light camera to shoot the same person in the same posture; and another group of near-infrared image sample and visible light image sample is obtained by shooting the same person in different postures.

At block S102, an adversarial network to be trained is obtained. The adversarial network includes the generative network and a discrimination network, the generative network is configured to generate each near-infrared image according to an input visible-light image, the discrimination network is configured to determine whether an input image is real or generated.

Examples of structure of the generative network may be, but are not limited to, U-net in Pix2Pix network, encoding and decoding in CYCLE GAN or other possible structures. The structures may be tested based on scenario data to determine the best structure. In an alternative embodiment, residual block in the Pix2PixHD network may be selected as the generative network.

Similarly, examples of structure of the discrimination network may be, but are not limited to, PatchGAN in Pix2Pix network, several convolution layers and output layers, or other possible structures. The structures may be tested based on scenario data to determine the best structure.

At block S103, a first objective function is constructed according to a first distance between each generated near-infrared image and the corresponding near-infrared image sample in an image space and a second distance between each generated near-infrared image and the corresponding near-infrared image sample in a feature space.

Alternatively, the first distance in the image space, which is also called L1 loss, is obtained, according to pixel values of corresponding pixels of each generated near-infrared image and the corresponding near-infrared image sample. In detail, a sum of absolute differences of the corresponding pixels is taken as the first distance in the image space.

Each group of the corresponding pixels may include a pixel of the generated near-infrared image and a pixel of the near-infrared image sample located in the same position, namely, in the same row and the same column.

The second distance in the feature space is obtained according to a deep feature of each generated near-infrared image and the corresponding near-infrared image sample. In detail, image features are extracted by a loss network, such as Visual Geometry Group (VGG) network, and the second distance between deep features is obtained, as shown in formula (1).

$$\text{LOSS}_1 = \frac{1}{C_j H_j W_j} \left\| \varphi_j(y) - \varphi_j(\overset{\bullet}{y}) \right\|_2^2 \quad (1)$$

In which, $\varphi$ denotes the loss network, $C_j$ denotes the j-th layer of the loss network, $C_j H_j W_j$ denotes the size of a feature image in the j-th layer, $\overset{\bullet}{y}$ denotes the near-infrared image sample, y denotes the generated near-infrared image.

A weighed sum of the first distance in the image space and the second distance in the feature space is obtained to obtain the first objective function after the first distance in the image space and the second distance in the feature space are obtained.

At block S104, an adversarial training is performed on the adversarial network with the training sample set based on optimizing a value of the first objective function.

When training the adversarial network, the visible-light image samples are input to the generative network to generate the corresponding near-infrared images; each of the generated near-infrared images and the near-infrared image sample in the same group are input into the discrimination network to output a parameter value between 0 and 1. 0 expresses that the discrimination result is false, 1 expresses that the discrimination result is true.

In an optional implementation, first the discrimination network is trained through a few iterations, and the generative network and the discrimination network are trained alternately after discriminant accuracy of the discrimination network reaches a preset value. In this embodiment, the generative network in the adversarial network is trained by optimizing the value of the first objective function, for example, a trained generative network is obtained by minimizing the value of the first objective function and continuously iterating image parameters in the generative network. The discrimination network may be trained by a loss function in the related art, which is not limited in this embodiment.

With embodiments of the present disclosure, the first objective function is constructed according to the first distance in the image space and the second distance in the feature space. Thus, when the first objective function is optimized, the generated near-infrared image is fitted to the near-infrared image sample in two dimensions of the image space and the feature space, therefore, the obtained generative network has high accuracy.

Further, with obtaining the first distance between each generated near-infrared image and the corresponding near-infrared image sample in the image space according to the pixel values of the corresponding pixels of the two images, supervision in pixel-level may be achieved. With obtaining the second distance between each generated near-infrared image and the corresponding near-infrared image sample in the feature space according to the deep feature of the two images, supervision of the deep feature may be achieved.

Embodiment 2

Figure 2:
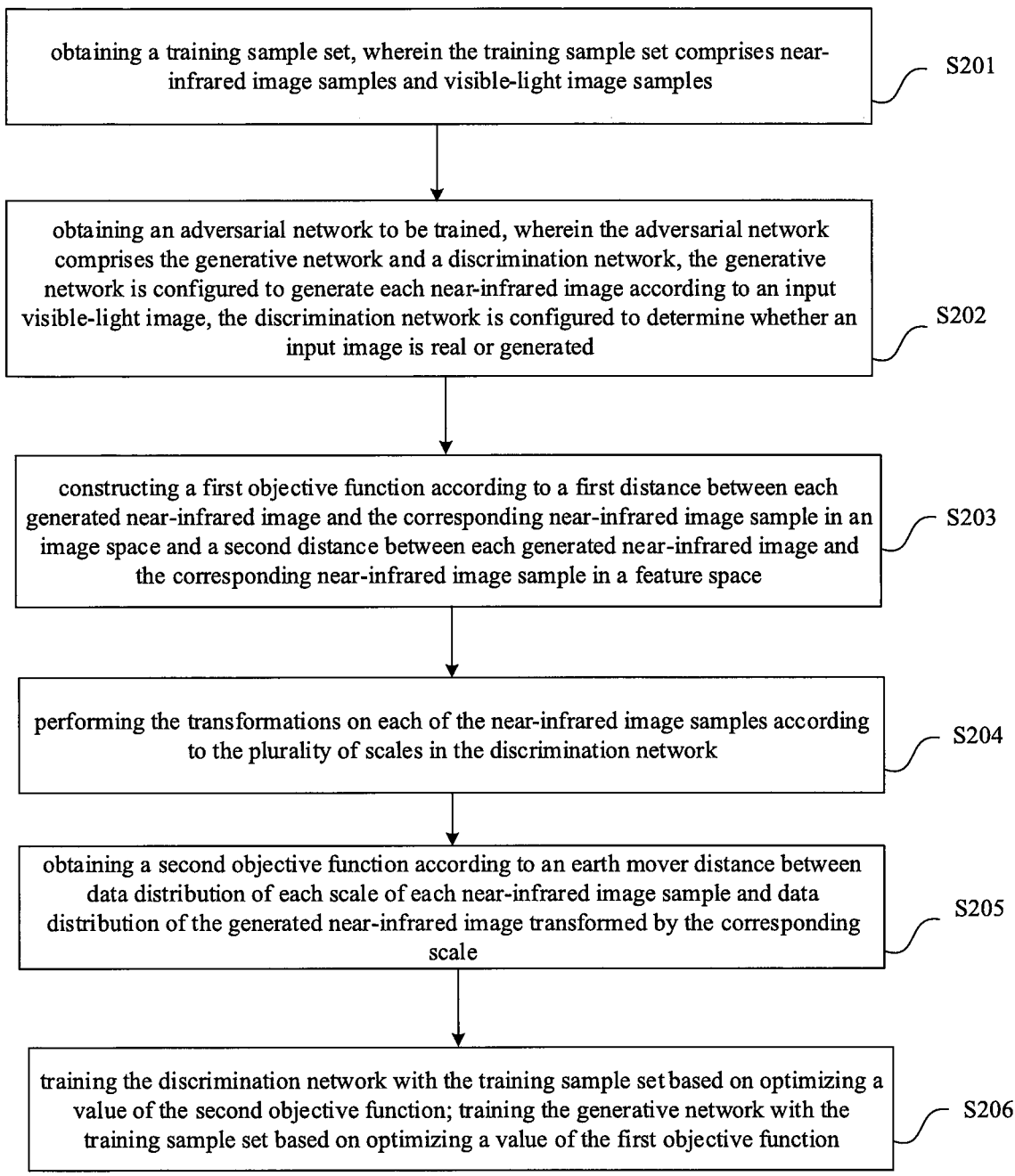
FIG. 2 is a flow chart illustrating a method for training a generative network according to Embodiment 2 of the present disclosure.

FIG. 2 is a flow chart illustrating a method for training a generative network according to Embodiment 2 of the present disclosure. The embodiments of the present disclosure are implemented on the basis of the technical solution according to the previously various embodiments.

Further, the discrimination network is configured to perform transformations with a plurality of scales on each input near-infrared image and determine whether the near-infrared images transformed by the plurality of scale are real or generated. On the basis of the above method, additional operations "performing the transformations on the near-infrared image samples according to the plurality of scales in the discrimination network; obtaining a second objective function according to an earth mover distance between data distribution of each scale of each near-infrared image sample and data distribution of the generated near-infrared image transformed by the corresponding scale; training the discrimination network with the training sample set based on optimizing a value of the second objective function" are added, so as to improve the accuracy of the discrimination network and the accuracy of the generative network.

As illustrated in FIG. 2, the method for generating the generative network includes the following.

At block S201, a training sample set is obtained. The training sample set includes near-infrared image samples and visible-light image samples.

At block S202, an adversarial network to be trained is obtained. The adversarial network includes the generative network and a discrimination network, the generative network is configured to generate each near-infrared image according to an input visible-light image, the discrimination network is configured to determine whether an input image is real or generated.

At block S203, a first objective function is constructed according to a first distance between each generated near-infrared image and the corresponding near-infrared image sample in an image space and a second distance between each generated near-infrared image and the corresponding near-infrared image sample in a feature space.

At block S204, the transformations are performed on each of the near-infrared image samples according to the plurality of scales in the discrimination network.

At block S205, a second objective function is obtained according to an earth mover distance between data distribution of each scale of each near-infrared image sample and data distribution of the generated near-infrared image transformed by the corresponding scale.

At block S206, the discrimination network is trained with the training sample set based on optimizing a value of the second objective function; the generative network is trained with the training sample set based on optimizing a value of the first objective function.

Optionally, the plurality of scales may include an original image, ½ of the original image and ¼ of the original image. Based on this, the original image of each near-infrared image sample is retained, and each near-infrared image sample transformed by ½ scale is sampled, and each near-infrared image sample transformed by ¼ scale is sampled.

The discrimination network in the embodiment is the discrimination network with the plurality of scales. Optionally, the discrimination network includes a plurality of independent subnetworks. The plurality of subnetworks are configured to perform the transformations on each generated near-infrared image according to the plurality of scales, and determine that whether the input near-infrared image is real or generated according to the corresponding near-infrared image sample of the same scale. The plurality of subnetworks may share parameters to improve training efficiency.

Formula (2) illustrates an expression of the second objective function.

$$\text{LOSS}_2 = \max_{D_1, D_2, D_3} \sum_{k=1,2,3} \mathcal{L}_{GAN}(G, D_k) \quad (2)$$

Formula (3) illustrates an expression of an objective function of the entire adversarial network.

$$\text{LOSS} = \min_G \max_{D_1, D_2, D_3} \sum_{k=1,2,3} \mathcal{L}_{GAN}(G, D_k) \quad (3)$$

In which, $D_1$, $D_2$, $D_3$ denotes the discrimination network of three scales. G denotes the generative network. GAN denotes the earth mover distance (namely, Wasserstein distance) between the data distribution of each generated near-infrared image and the data distribution of each scale of each near-infrared image sample. Max denotes that the discrimination network maximizes the discrimination that whether each input image is the generated near-infrared image or the real near-infrared image. Min denotes that the generative network minimizes the discriminant accuracy.

In a specific embodiment, first the discrimination network is trained alone by minimizing the value of the second objective function. When the discriminant accuracy reaches the preset value, the parameters of the discrimination network are fixed, the value of the first objective function is minimized and a maximum value of a sum of the Wasserstein distances is minimized to train the parameters of the generative network. The parameters of the generative network are fixed, and the value of the second objective function is minimized to train the parameters of the discrimination network. The adversarial network is trained alternately like that.

In this embodiment, the discrimination network is the discrimination network with the plurality of scales, thereby determining that whether the images are real or generated from the plurality of scales. With obtaining the second objective function according to the earth mover distance between the images with various scales, and optimizing the second objective function to fit the data distribution of the near-infrared image samples to the data distribution of the generated near-infrared images from various scales, the accuracy of the discrimination network is improved and the accuracy of the generative network during the adversarial training is improved.

Embodiment 3

Figure 3:
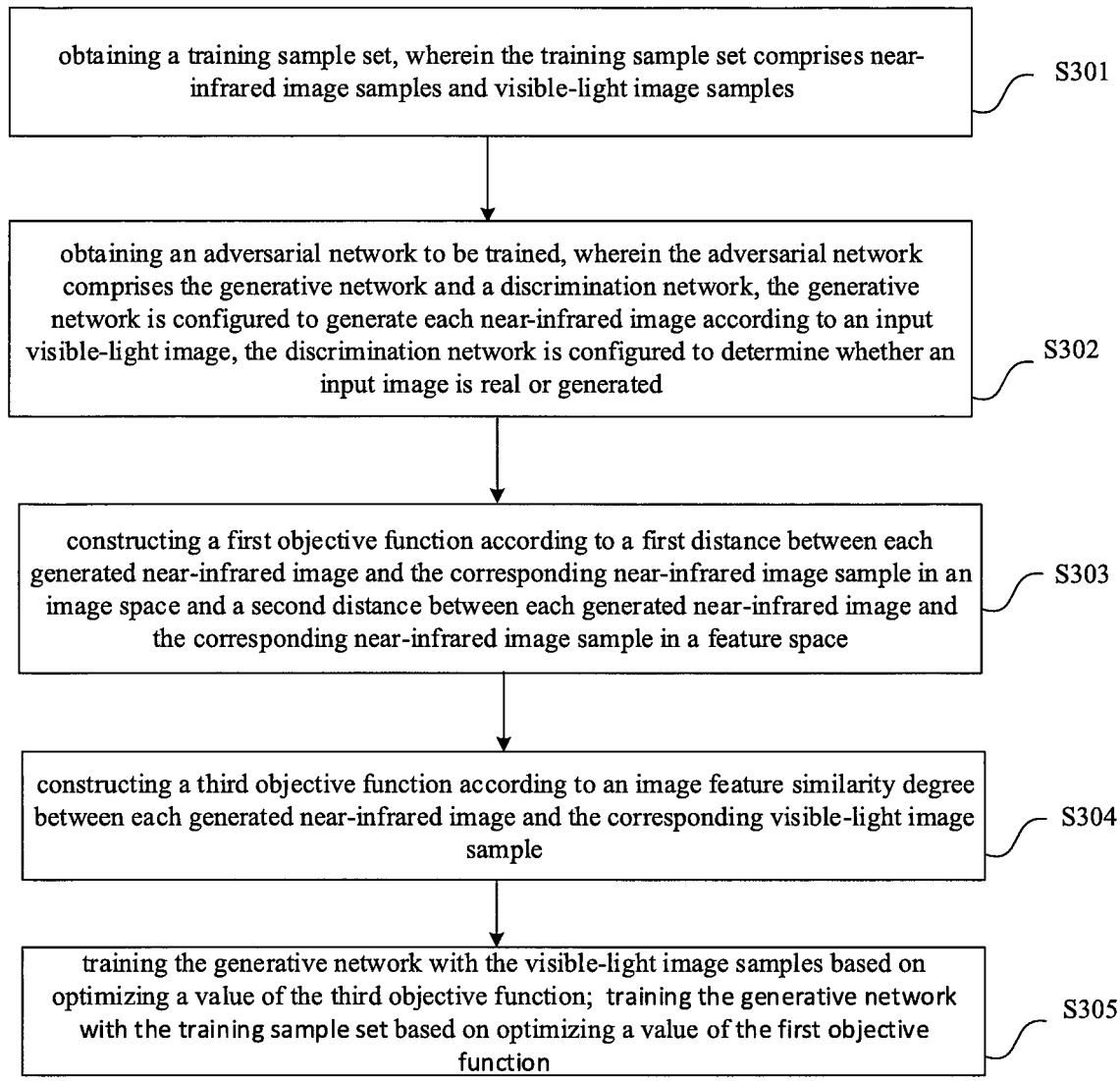
FIG. 3 is a flow chart illustrating a method for training a generative network according to Embodiment 3 of the present disclosure.

FIG. 3 is a flow chart illustrating a method for training a generative network according to Embodiment 3 of the present disclosure. The embodiments of the present disclosure are implemented on the basis of the technical solution according to the previously various embodiments.

On the basis of the above method, additional operations "constructing a third objective function according to an image feature similarity degree between each generated near-infrared image and the corresponding visible-light image sample; training the generative network with the visible-light image samples based on optimizing a value of the third objective function" are added, so as to improve the accuracy of the generative network.

As illustrated in FIG. 3, the method for generating the generative network includes the following.

At block S301, a training sample set is obtained. The training sample set includes near-infrared image samples and visible-light image samples.

At block S302, an adversarial network to be trained is obtained. The adversarial network includes the generative network and a discrimination network, the generative network is configured to generate each near-infrared image according to an input visible-light image, the discrimination network is configured to determine whether an input image is real or generated.

At block S303, a first objective function is constructed according to a first distance between each generated near-infrared image and the corresponding near-infrared image sample in an image space and a second distance between each generated near-infrared image and the corresponding near-infrared image sample in a feature space.

At block S304, a third objective function is constructed according to an image feature similarity degree between each generated near-infrared image and the corresponding visible-light image sample;

At block S305, the generative network is trained with the visible-light image samples based on optimizing a value of the third objective function; the generative network is trained with the training sample set based on optimizing a value of the first objective function.

The input visible-light image sample each is generated the near-infrared image through the generative network. The content of the images should not change after the image conversion. Therefore, image features should be similar. Based on this, the image feature similarity degree, such as difference of characteristic cosine, between each generated near-infrared image and the corresponding visible-light image sample may be obtained to construct the third objective function. In an application scenario of training the generative network generated the near-infrared image of a human face, facial features are extracted from each generated near-infrared image and the corresponding input visible-light image sample, and the similarity degree of the facial features is obtained.

In a specific embodiment, a weighted sum of the first objective function and the third objective function is obtained to form a joint function. Weights may be preset autonomously or obtained through training. First, the discrimination network may be trained alone, for example, the discrimination network is trained alone by optimizing the value of the second objective function. When the discriminant accuracy reaches the preset value, the parameters of the discrimination network are fixed, the parameters of the generative network are trained by optimizing the value of the joint function. The parameters of the generative network are fixed, and the parameters of the discrimination network are trained, such as the parameters of the discrimination network are trained by optimizing the value of the second objective function. The adversarial network is trained alternately like that.

In this embodiment, with constructing the third objective function according to the image feature similarity degree, the generated near-infrared image is fitted to the visible-light image sample from a dimension of the image feature, to enable the image semantics contained in the two are similar, thus, the accuracy of the generation network is improved and the accuracy of the generation network during the confrontation training is improved.

In some embodiments, before performing the adversarial training on the adversarial network to be trained with the training sample set based on optimizing a value of the first objective function, the method further includes: reconstructing the near-infrared image samples and the visible-light image samples in three-dimensions respectively to generate two-dimensional projection images at the same angle; performing pixel alignment on each of the near-infrared image samples based on the two-dimensional projection image corresponding to the near-infrared image sample; performing pixel alignment on each of the visible-light image samples based on the corresponding two-dimensional projection image corresponding to the visible-light image sample.

When the near-infrared camera and the common visible light camera are employed to shoot the same person in the same posture, the posture of the person may slightly change, and the shooting time cannot be guaranteed to be absolutely synchronous. Therefore, the pixels between the near-infrared image and the visible-light image are not aligned. Different shooting parameters of the near-infrared camera and the ordinary visible light camera may also cause the pixels to be not aligned. It is disadvantageous to train the high accuracy generated network. Based on this, the near-infrared image samples and the visible-light image samples are reconstructed in three-dimensions respectively. The method of reconstructing in three-dimensions is not limited herein. Optionally, in the application scenario of training the generative network generated the near-infrared image of a human face, face reconstruction in three-dimensions may be performed by employing a method provided in a paper called "GANFIT: Generative Adversarial Network Fitting for High Fidelity 3D Face Reconstruction" to adjust pose angles of the faces to be consistent and to generate face texture mappings. The method GANFIT provided in the paper employ end-to-end differentiable rendering, and the output may be completed at one time through a neural network without other calculation except the neural network, which is beneficial to improve efficiency of the pixel alignment, thereby improving training efficiency of the generative network.

The near-infrared image sample and the visible-light image sample are mapped to the same face model, after the face texture mappings thereof are generated, to obtain two mapped face models. Both the two mapped face models are facing the cameras, or both present at the same angle with the cameras, the aligned two-dimensional projection images may be obtained. The pixels in the near-infrared image sample are adjusted to perform the pixel alignment based on the corresponding two-dimensional projection image; similarly, the pixels in the visible-light image sample are adjusted to perform the pixel alignment based on the corresponding two-dimensional projection image.

The adversarial network may be trained by the pixel aligned training set.

In this embodiment, with performing the three-dimensional reconstruction and the two-dimensional pixel alignment on the samples, the pixel alignment of the near-infrared image samples and the visible-light image samples is achieved, and influence of shooting angles and camera parameters is reduced which is beneficial to improve the accuracy of the generative network.

In some embodiments, before performing the adversarial training on the adversarial network to be trained with the training sample set based on optimizing a value of the first objective function, the method further includes: obtaining structural information in the near-infrared image samples and the visible-light image samples by performing color encoding on the near-infrared image samples and the visible-light image samples.

Optionally, YUV color encoding is performed on each near-infrared image sample and each visible-light image sample. Each near-infrared image sample and each visible-light image sample are projected to YUV space. "Y" denotes luminance or luma, namely, a gray-scale value, "U" and "V" denote chrominance or chroma. The corresponding YCbCr images are generated after the image sample is projected to YUV space.

The following formulas (3)-(5) illustrate formulas for converting the visible light image sample into the YCbCr image, and formulas (6)-(7) illustrate formulas for converting the near-infrared image sample into the YCbCr image.

$$Y=0.257*R+0.564*G+0.098*B+16; \quad (3)$$

$$Cb=-0.148*R-0.291*G+0.439*B+128; \quad (4)$$

$$Cr=0.439*R-0.368*G-0.071*B+128; \quad (5)$$

$$Y=0.257*N+0.564*I+0.098*R+16; \quad (6)$$

$$Cb=-0.148*N-0.291*I+0.439*R+128; \quad (7)$$

$$Cr=0.439*N-0.368*I-0.071*R+128; \quad (8)$$

As seen from the above formulas, each Y channel, which has the most conversion value, saves most of the structural information after the visible light image samples and the near-infrared image samples are converted into YCbCr images. In the application scenario of training the generative network generated the near-infrared image of a human face, each Cb channel is allocated the least parameters, and the human face rarely has blue information, therefore the YCbCr image may better separate the structural information. The adversarial network may be trained by the color-coded training set.

In this embodiment, a difference between the near-infrared image sample and the visible light image sample lies in chrominance, and a similarity lies in structure. Obtaining structural information in the samples may cause the image samples having closer content, which is beneficial to improve the accuracy of the generation network.

Embodiment 4

Figure 4:
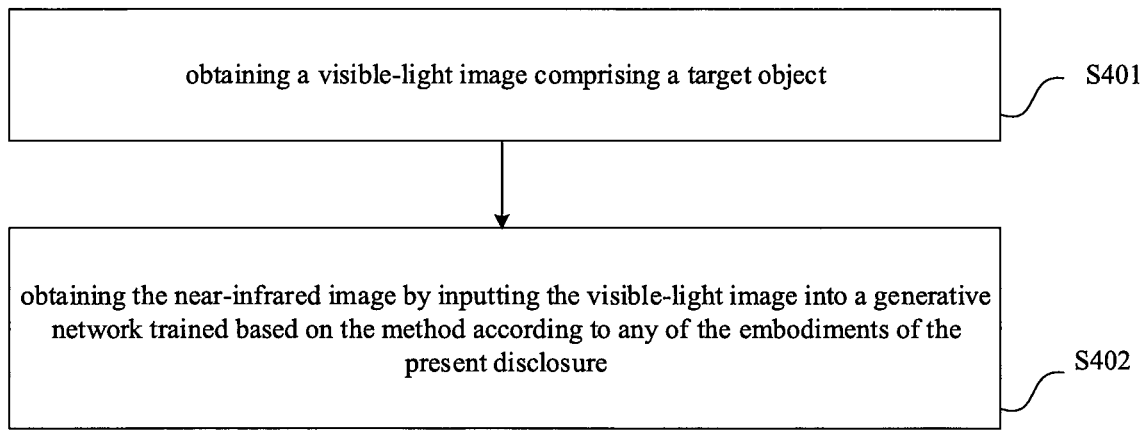
FIG. 4 is a flow chart illustrating a method for generating a near-infrared image according to Embodiment 4 of the present disclosure.

FIG. 4 is a flow chart illustrating a method for generating a near-infrared image according to Embodiment 4 of the present disclosure. Embodiments of the disclosure are applicable to a condition for generating a near-infrared image according to a visible-light image. Embodiments may be executed by an apparatus for generating a near-infrared image. The apparatus may be implemented by software and/or hardware and be configured in an electronic device having a certain data operation ability.

As illustrated in FIG. 4, the method for generating a near-infrared image includes the following.

At block S401, a visible-light image including a target object is obtained.

At block 402, the near-infrared image is obtained by inputting the visible-light image into a generative network. The generative network is trained based on the method according to any one of the previous embodiments of the present disclosure.

In this embodiment, the obtained near-infrared image having high accuracy may be configured to train a face recognition network.

With embodiments of the present disclosure, the generative network has the high accuracy, and the visible-light image including the target object is obtained based on the generative network having high accuracy, thereby improving the accuracy of the obtained visible-light image.

In an alternative embodiment of the present disclosure, the method further includes: obtaining a partial visible-light image of a preset point of interest including the target object from the visible-light image; obtaining a partial near-infrared image by inputting the partial visible-light image into the generative network; obtaining a final near-infrared image by performing image fusion on the near-infrared image and the partial near-infrared image.

The preset point of interest may be an image area of interest. Taking a face of the target object as an example, the preset point of interest may include a key point of the face, such as at least one of a mouth and eyes, or other key points of the face. In detail, face key point recognition is on the visible-light image, the area where the mouth and/or the eyes are located is recognized. A partial visible-light image including the mouth and/or the eyes may be obtained from the visible-light image. The partial image is input into the generative network to obtain the partial near-infrared image.

Alternatively, a weighted sum of pixel values of corresponding pixels of the near-infrared image and the partial near-infrared image is obtained. In order to highlight characteristics of the preset point of interest, the pixel value of the partial near-infrared image may be given a higher weight.

In this embodiment, with generating the partial visible-light image of the preset point of interest including the target object, and fusing the partial near-infrared image with the overall near-infrared image, partial details of the overall near-infrared image are enhanced to improve partial clarity of the near-infrared image. With obtaining the weighted sum of the pixel values of the corresponding pixels, partial details are enhanced from the pixel-level to further improve the partial clarity of the near-infrared image.

In an application scenario that generates the near-infrared image including the human face, the mouth and the eyes are the key points of face recognition and are also parts with independent characteristics. partial details of the mouth and the eyes are enhanced, such that generated face images may better train a face recognition model.

Embodiment 5

Figure 5:
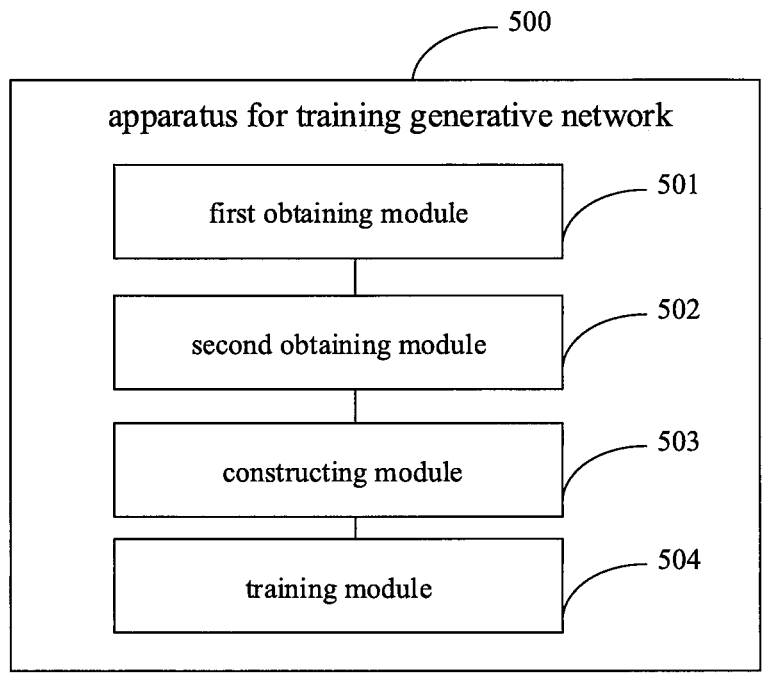
FIG. 5 is a block diagram illustrating an apparatus for training a generative network according to Embodiment 5 of the present disclosure.

FIG. 5 is a flow chart illustrating an apparatus for training a generative network according to Embodiment 5 of the present disclosure. Embodiments of the disclosure are applicable to a condition for training the generative network configured for generate a near-infrared image according to a visible-light image. The apparatus may be implemented by software and/or hardware and be configured in an electronic device having a certain data operation ability.

As illustrated in FIG. 5, an apparatus 500 for training a generative network includes a first obtaining module 501, a second obtaining module 502, a constructing module 503 and a training module 504.

The first obtaining module 501 is configured to obtain a training sample set. The training sample set includes near-infrared image samples and visible-light image samples;

The second obtaining module 502 is configured to obtain an adversarial network to be trained. The adversarial network includes the generative network and a discrimination network, the generative network is configured to generate each near-infrared image according to an input visible-light image, the discrimination network is configured to determine whether an input image is real or generated;

The constructing module 503 is configured to construct a first objective function according to a first distance between each generated near-infrared image and the corresponding near-infrared image sample in an image space and a second distance between each generated near-infrared image and the corresponding near-infrared image sample in a feature space;

The training module 504 is configured to perform an adversarial training on the adversarial network with the training sample set based on optimizing a value of the first objective function.

With embodiments of the present disclosure, the first objective function is constructed according to the first distance in the image space and the second distance in the feature space. Thus, when the first objective function is optimized, the generated near-infrared image is fitted to the near-infrared image sample from two dimensions of the image space and the feature space, therefore, the obtained generative network has high accuracy.

Further, the constructing module 503 is configured to, obtain the first distance in the image space according to pixel values of corresponding pixels of each generated near-infrared image and the corresponding near-infrared image sample; obtain the second distance in the feature space according to a deep feature of the generated near-infrared image and the corresponding near-infrared image sample; construct the first objective function according to the first distance in the image space and the second distance in the feature space.

Further, the discrimination network is configured to perform transformations with a plurality of scales on each input near-infrared image and determine whether the near-infrared images transformed by the plurality of scale are real or generated. The apparatus further includes a discrimination training module. The discrimination training module is configured to, perform the transformations on each of the near-infrared image samples according to the plurality of scales in the discrimination network; obtain a second objective function according to an earth mover distance between data distribution of each scale of each near-infrared image sample and data distribution of the generated near-infrared image transformed by the corresponding scale; train the discrimination network with the training sample set based on optimizing a value of the second objective function.

Further, the apparatus further includes a generation training module. The generation training module is configured to, construct a third objective function according to an image feature similarity degree between each generated near-infrared image and the corresponding visible-light image sample; train the generative network with the visible-light image samples based on optimizing a value of the third objective function.

Further, the apparatus further includes an alignment module. The alignment module is configured to before performing the adversarial training on the adversarial network to be trained with the training sample set based on optimizing a value of the first objective function, reconstruct the near-infrared image samples and the visible-light image samples in three-dimensions respectively to generate two-dimensional projection images at the same angle; perform pixel alignment on each of the near-infrared image samples based on the two-dimensional projection image corresponding to the near-infrared image sample; perform pixel alignment on each of the visible-light image samples based on the corresponding two-dimensional projection image corresponding to the visible-light image sample.

Further, the apparatus further includes an obtaining module. The obtaining module is configured to before performing the adversarial training on the adversarial network to be trained with the training sample set based on optimizing a value of the first objective function, obtain structural information in the near-infrared image samples and the visible-light image samples by performing color encoding on the near-infrared image samples and the visible-light image samples.

The apparatus 500 for training the generative network according to the embodiment of the present disclosure may perform the method for training a generative network according to any embodiment of the present disclosure, and has corresponding functional modules for performing the method for training a generative network and beneficial effects. For content not described in detail in the embodiment, reference may be made to the description in any method embodiment of the present disclosure.

Embodiment 6

Figure 6:
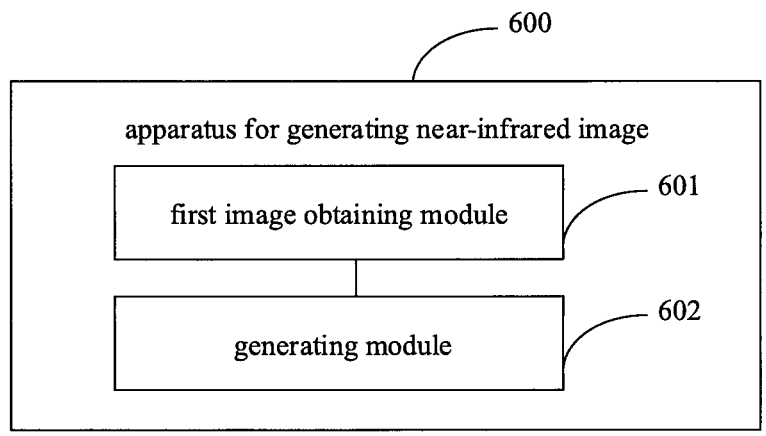
FIG. 6 is a block diagram illustrating an apparatus for generating a near-infrared image according to Embodiment 6 of the present disclosure.

FIG. 6 is a flow chart illustrating an apparatus for generating a near-infrared image according to Embodiment 6 of the present disclosure. Embodiments of the disclosure are applicable to a condition for generating a near-infrared image according to a visible-light image. The apparatus may be implemented by software and/or hardware and be configured in an electronic device having a certain data operation ability.

As illustrated in FIG. 6, an apparatus 600 for generating a near-infrared image includes a first image obtaining module 601 and a generating module 602.

The first image obtaining module 601 is configured to obtain a visible-light image including a target object.

The generating module 602 is configured to obtain the near-infrared image by inputting the visible-light image into a generative network. The generative network is trained based on the method according to the first aspect embodiment of the present disclosure.

With embodiments of the present disclosure, the generative network has the high accuracy, and the visible-light image including the target object is obtained based on the generative network having high accuracy, thereby improving the accuracy of the obtained visible-light image.

Alternatively, the apparatus further includes a fusion module. The fusion module is configured to obtain a partial visible-light image of a preset point of interest including the target object from the visible-light image; obtain a partial near-infrared image by inputting the partial visible-light image into the generative network; obtain a final near-infrared image by performing image fusion on the near-infrared image and the partial near-infrared image.

Alternatively, when the fusion module is configured to obtain the final near-infrared image by performing the image fusion on the near-infrared image and the partial near-infrared image, the fusion module is specifically configured to obtain a weighted sum of pixel values of corresponding pixels of the near-infrared image and the partial near-infrared image.

Alternatively, the target object includes a human face, and the preset point of interest includes at least one of a mouth and eyes.

The apparatus 600 for generating the near-infrared image according to the embodiment of the present disclosure may perform the method for generating the near-infrared image according to any embodiment of the present disclosure, and has corresponding functional modules for performing the method for generating the near-infrared image and beneficial effects. For content not described in detail in the embodiment, reference may be made to the description in any method embodiment of the present disclosure.

Embodiment 7

According to embodiments of the disclosure, the disclosure also provides an electronic device and a readable storage medium.

Figure 7:
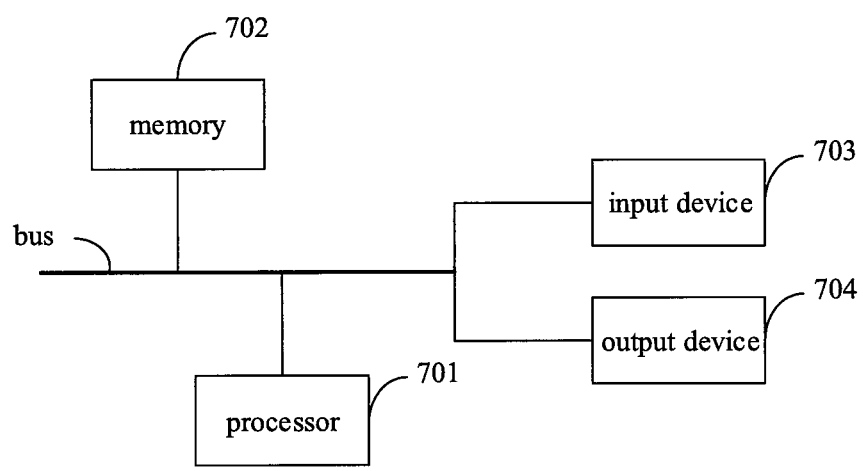
FIG. 7 is a block diagram illustrating an electronic device for implementing the method for training a generative network or the method for generating a near-infrared image according to embodiments of the present disclosure.

As illustrated in FIG. 7, FIG. 7 is a block diagram illustrating an electronic device capable of implementing a method for training a generative network or a method for generating a near-infrared image according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 7, the electronic device includes: one or more processors 701, a memory 702, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 7, a processor 701 is taken as an example.

The memory 702 is a non-transitory computer readable storage medium provided by the disclosure. The memory is configured to store instructions executable by at least one processor, to enable the at least one processor to execute the method for training the generative network or the method for generating the near-infrared image provided by the disclosure. The non-transitory computer readable storage medium provided by the disclosure is configured to store computer instructions. The computer instructions are configured to enable a computer to execute the method for training the generative network or the method for generating the near-infrared image provided by the disclosure.

As the non-transitory computer readable storage medium, the memory 702 may be configured to store non-transitory software programs, non-transitory computer executable programs and modules, such as program instructions/module (such as the first obtaining module 501, the second obtaining module 502, the constructing module 503 and the training module 504 illustrated in FIG. 5) corresponding to the method for training the generative network according to embodiments of the disclosure; or such as program instructions/module (such as the first image obtaining module 601 and the generating module 602 illustrated in FIG. 6) corresponding to the method for generating the near-infrared image according to embodiments of the disclosure. The processor 701 is configured to execute various functional applications and data processing of the server by operating non-transitory software programs, instructions and modules stored in the memory 702, that is, implements the method for training the generative network or the method for generating the near-infrared image according to the above method embodiments.

The memory 702 may include a storage program region and a storage data region. The storage program region may store an application required by an operating system and at least one function. The storage data region may store data created according to predicted usage of the electronic device configured for implementing the method for training the generative network or the method for generating the near-infrared image. In addition, the memory 702 may include a high-speed random access memory, and may also include a non-transitory memory, such as at least one disk memory device, a flash memory device, or other non-transitory solid-state memory device. In some embodiments, the memory 702 may optionally include memories remotely located to the processor 701, and these remote memories may be connected to the electronic device via a network. Examples of the above network include, but are not limited to, an Internet, an intranet, a local area network, a mobile communication network and combinations thereof.

The electronic device may also include: an input device 703 and an output device 704. The processor 701, the memory 702, the input device 703, and the output device 704 may be connected via a bus or in other means. In FIG. 7, the bus is taken as an example.

The input device 703 may receive inputted digital or character information, and generate key signal input related to user setting and function control of the electronic device capable of implementing the method for training the generative network or the method for generating the near-infrared image, such as a touch screen, a keypad, a mouse, a track pad, a touch pad, an indicator stick, one or more mouse buttons, a trackball, a joystick and other input device. The output device 704 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solution according to embodiments of the disclosure, the first objective function is constructed according to the distances in the image space and the feature space of the generated near-infrared image and each of the near-infrared image samples. Thus, when the first objective function is optimized, the generated near-infrared image is fitted to the near-infrared image sample from two dimensions of the image space and the feature space to obtain the generative network having high accuracy.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the principle of the disclosure shall be included in the protection scope of disclosure.

What is claimed is:

1. A method for training a generative network, comprising:
    obtaining a training sample set, wherein the training sample set comprises near-infrared image samples and visible-light image samples;
    obtaining an adversarial network to be trained, wherein the adversarial network comprises the generative network and a discrimination network, the generative network is configured to generate each near-infrared image according to an input visible-light image, the discrimination network is configured to determine whether an input image is real or generated;
    constructing a first objective function according to a first distance between each generated near-infrared image and a near-infrared image sample in an image space and a second distance between each generated near-infrared image and the corresponding near-infrared image sample in a feature space;
    constructing a third objective function according to an image feature similarity degree between each generated near-infrared image and the corresponding visible-light image sample;
    training the generative network with the visible-light image samples based on optimizing a value of the third objective function; performing an adversarial training on the adversarial network with the training sample set based on optimizing a value of the first objective function;
    wherein before performing the adversarial training on the adversarial network to be trained with the training sample set based on optimization of the first objective function, the method further comprises:
    reconstructing the near-infrared image samples and the visible-light image samples in three-dimensions respectively to generate two-dimensional projection images at the same angle;
    performing pixel alignment on each of the near-infrared image samples based on the two-dimensional projection image corresponding to the near-infrared image sample;
    performing pixel alignment on each of the visible-light image samples based on the corresponding two-dimensional projection image corresponding to the visible-light image sample.

2. The method according to claim 1, wherein, the constructing the first objective function according to the first distance between each generated near-infrared image and the corresponding near-infrared image sample in the image space and the second distance between each generated near-infrared image and the corresponding near-infrared image sample in the feature space, comprises:
    obtaining the first distance in the image space according to pixel values of corresponding pixels of each generated near-infrared image and the corresponding near-infrared image sample;
    obtaining the second distance in the feature space according to a deep feature of the generated near-infrared image and the corresponding near-infrared image sample;
    constructing the first objective function according to the first distance in the image space and the second distance in the feature space.

3. The method according to claim 2, wherein, the discrimination network is configured to perform transformations with a plurality of scales on each input near-infrared image and determine whether the near-infrared images transformed by the plurality of scales are real or generated, and the method further comprises:

performing the transformations on each of the near-infrared image samples according to the plurality of scales in the discrimination network;

obtaining a second objective function according to an earth mover distance between data distribution of each scale of each near-infrared image sample and data distribution of the generated near-infrared image transformed by the corresponding scale;

training the discrimination network with the training sample set based on optimizing a value of the second objective function.

4. The method according to claim 2, wherein before performing the adversarial training on the adversarial network to be trained with the training sample set based on optimizing a value of the first objective function, the method further comprises:

obtaining structural information in the near-infrared image samples and the visible-light image samples by performing color encoding on the near-infrared image samples and the visible-light image samples.

5. The method according to claim 1, wherein, the discrimination network is configured to perform transformations with a plurality of scales on each input near-infrared image and determine whether the near-infrared images transformed by the plurality of scales are real or generated, and the method further comprises:

performing the transformations on each of the near-infrared image samples according to the plurality of scales in the discrimination network;

obtaining a second objective function according to an earth mover distance between data distribution of each scale of each near-infrared image sample and data distribution of the generated near-infrared image transformed by the corresponding scale;

training the discrimination network with the training sample set based on optimizing a value of the second objective function.

6. The method according to claim 1, wherein before performing the adversarial training on the adversarial network to be trained with the training sample set based on optimizing a value of the first objective function, the method further comprises:

obtaining structural information in the near-infrared image samples and the visible-light image samples by performing color encoding on the near-infrared image samples and the visible-light image samples.

7. The method according to claim 1, wherein training the generative network comprising:

in response to a discrimination accuracy of the discrimination network reaching a preset value through training the discrimination network, determining a joint function by obtaining a weighted sum of the first objective function and the third objective function, training the generative network by optimizing a value of the joint function.

8. A method for generating a near-infrared image, comprising:

obtaining a visible-light image comprising a target object;

obtaining the near-infrared image by inputting the visible-light image into a generative network trained based on a method comprising:

obtaining a training sample set, wherein the training sample set comprises near-infrared image samples and visible-light image samples;

obtaining an adversarial network to be trained, wherein the adversarial network comprises the generative network and a discrimination network, the generative network is configured to generate each near-infrared image according to an input visible-light image, the discrimination network is configured to determine whether an input image is real or generated;

constructing a first objective function according to a first distance between each generated near-infrared image and a near-infrared image sample in an image space and a second distance between each generated near-infrared image and the corresponding near-infrared image sample in a feature space;

constructing a third objective function according to an image feature similarity degree between each generated near-infrared image and the corresponding visible-light image sample;

training the generative network with the visible-light image samples based on optimizing a value of the third objective function; performing an adversarial training on the adversarial network with the training sample set based on optimizing a value of the first objective function;

wherein before performing the adversarial training on the adversarial network to be trained with the training sample set based on optimization of the first objective function, the method further comprises:

reconstructing the near-infrared image samples and the visible-light image samples in three-dimensions respectively to generate two-dimensional projection images at the same angle;

performing pixel alignment on each of the near-infrared image samples based on the two-dimensional projection image corresponding to the near-infrared image sample;

performing pixel alignment on each of the visible-light image samples based on the corresponding two-dimensional projection image corresponding to the visible-light image sample.

9. The method according to claim 8, further comprising:

obtaining a partial visible-light image of a preset point of interest comprising the target object from the visible-light image;

obtaining a partial near-infrared image by inputting the partial visible-light image into the generative network;

obtaining a final near-infrared image by performing image fusion on the near-infrared image and the partial near-infrared image.

10. The method according to claim 9, wherein the obtaining the final near-infrared image by performing the image fusion on the near-infrared image and the partial near-infrared image comprises:

obtaining a weighted sum of pixel values of corresponding pixels of the near-infrared image and the partial near-infrared image.

11. The method according to claim 10, wherein the target object comprises a human face, and the preset point of interest comprises at least one of a mouth and eyes.

12. The method according to claim 9, wherein the target object comprises a human face, and the preset point of interest comprises at least one of a mouth and eyes.

13. An electronic device, comprising:
at least one processor; and
a memory connected in communication with the at least one processor; wherein,
the memory stores instructions executable by the at least one processor, when the instructions are executed by the at least one processor, the at least one processor is configured to:
obtain a training sample set, wherein the training sample set comprises near-infrared image samples and visible-light image samples;
obtain an adversarial network to be trained, wherein the adversarial network comprises the generative network and a discrimination network, the generative network is configured to generate each near-infrared image according to an input visible-light image, the discrimination network is configured to determine whether an input image is real or generated;
construct a first objective function according to a first distance between each generated near-infrared image and a near-infrared image sample in an image space and a second distance between each generated near-infrared image and the corresponding near-infrared image sample in a feature space;
construct a third objective function according to an image feature similarity degree between each generated near-infrared image and the corresponding visible-light image sample;
train the generative network with the visible-light image samples based on optimizing a value of the third objective function; perform an adversarial training on the adversarial network with the training sample set based on optimizing a value of the first objective function;
wherein the at least one processor is configured to:
before performing the adversarial training on the adversarial network to be trained with the training sample set based on optimization of the first objective function, reconstruct the near-infrared image samples and the visible-light image samples in three-dimensions respectively to generate two-dimensional projection images at the same angle;
perform pixel alignment on each of the near-infrared image samples based on the two-dimensional projection image corresponding to the near-infrared image sample;
perform pixel alignment on each of the visible-light image samples based on the corresponding two-dimensional projection image corresponding to the visible-light image sample.

14. The electronic device according to claim 13, wherein, the at least one processor is configured to:
obtain the first distance in the image space according to pixel values of corresponding pixels of each generated near-infrared image and the corresponding near-infrared image sample;
obtain the second distance in the feature space according to a deep feature of the generated near-infrared image and the corresponding near-infrared image sample;
construct the first objective function according to the first distance in the image space and the second distance in the feature space.

15. The electronic device according to claim 13, wherein, the discrimination network is configured to perform transformations with a plurality of scales on each input near-infrared image and determine whether the near-infrared images transformed by the plurality of scales are real or generated, and the at least one processor is configured to:
perform the transformations on each of the near-infrared image samples according to the plurality of scales in the discrimination network;
obtain a second objective function according to an earth mover distance between data distribution of each scale of each near-infrared image sample and data distribution of the generated near-infrared image transformed by the corresponding scale;
train the discrimination network with the training sample set based on optimizing a value of the second objective function.

16. The electronic device according to claim 13, wherein, the at least one processor is configured to:
construct a third objective function according to an image feature similarity degree between each generated near-infrared image and the corresponding visible-light image sample;
train the generative network with the visible-light image samples based on optimizing a value of the third objective function.

17. The electronic device according to claim 13, wherein, the at least one processor is configured to:
before performing the adversarial training on the adversarial network to be trained with the training sample set based on optimization of the first objective function, reconstruct the near-infrared image samples and the visible-light image samples in three-dimensions respectively to generate two-dimensional projection images at the same angle;
perform pixel alignment on each of the near-infrared image samples based on the two-dimensional projection image corresponding to the near-infrared image sample;
perform pixel alignment on each of the visible-light image samples based on the corresponding two-dimensional projection image corresponding to the visible-light image sample; or
before performing the adversarial training on the adversarial network to be trained with the training sample set based on optimization of the first objective function, obtain structural information in the near-infrared image samples and the visible-light image samples by performing color encoding on the near-infrared image samples and the visible-light image samples.

18. The electronic device according to claim 13, wherein training the generative network comprising:
in response to a discrimination accuracy of the discrimination network reaching a preset value through training the discrimination network, determining a joint function by obtaining a weighted sum of the first objective function and the third objective function, training the generative network by optimizing a value of the joint function.

* * * * *